US005586663A

United States Patent [19]

Graudejus et al.

[11] Patent Number: 5,586,663

[45] Date of Patent: Dec. 24, 1996

[54] PROCESSING FOR THE OPTICAL SORTING OF BULK MATERIAL

[75] Inventors: Wolfgang Graudejus, Haselau; Eberhard Briem, Pinneberg; Wilhelm Haettich, Karlsruhe; Heribert Geisselmann, Stutensee, all of Germany

[73] Assignee: H.F. & Ph.F. Reemtsma GmbH & Co., Hamburg, Germany

[21] Appl. No.: 365,489

[22] Filed: Dec. 28, 1994

[30] Foreign Application Priority Data

Dec. 28, 1993 [DE] Germany .......................... 43 45 106.3

[51] Int. Cl.[6] ................................ B07C 5/342; G01J 3/46

[52] U.S. Cl. .......................... 209/582; 209/587; 209/939; 356/406; 356/407; 356/425

[58] Field of Search .................................... 209/576, 577, 209/580, 581, 582, 587, 938, 939; 356/406, 407, 416, 419, 425; 250/226

[56] References Cited

U.S. PATENT DOCUMENTS

| | | | |
|---|---|---|---|
| 3,560,758 | 2/1971 | Swanberg | 356/405 X |
| 4,110,826 | 8/1978 | Mollgaard et al. | 356/408 X |
| 4,830,194 | 5/1989 | Kajiura et al. | 209/587 X |
| 4,830,501 | 5/1989 | Terashita | 356/406 X |
| 5,062,714 | 11/1991 | Peterson et al. | 356/406 |
| 5,090,576 | 2/1992 | Menten | 209/587 |

FOREIGN PATENT DOCUMENTS

| | | | |
|---|---|---|---|
| 274832 | 3/1990 | Japan | 356/406 |

*Primary Examiner*—William E. Terrell
*Assistant Examiner*—Tuan Nguyen
*Attorney, Agent, or Firm*—Foley & Lardner

[57] ABSTRACT

The invention relates to a process for the optical sorting of bulk material in a colour-sorting machine while it is conveyed over a transport belt and moves past an observation head with a light source and a product signal receiver arranged in the vicinity of the light source, whereby the reflected light of the image points of the examination material is broken down into several spectral ranges by various colour filters of detection elements lying next to one another of a line of the receiver and the examination material is sorted on the basis of the colour values (measured value of the intensity in the colour in question). According to the invention, it is provided in order to improve the detection rate that, in the case of examination material mixed with reject parts, in each case the colour values of the product are studied in several selected sub-ranges, while, in every sub-range, a classifier ascertains connected areas of image points with colour values falling into the pertinent sub-range and carries out a classification according to preset criteria from the geometry and the size of these detection areas.

10 Claims, 4 Drawing Sheets

PROCESSING FOR THE OPTICAL SORTING OF BULK MATERIAL

The invention relates to a process for the optical sorting of bulk material, such as agricultural products, drugs, ores etc. in a colour-sorting machine.

It is already known that examination material is conveyed on belts and its image is recorded for examination by a diode line camera or a television camera. The recording of the signal preferably takes place in flight, when e.g. the examination material is transferred from one belt onto another belt. If the signal is recorded in flight, the examination material can be appraised from several sides with a defined background.

With modern systems, colour is also registered when the image is recorded. Colour is used to detect conspicuous regions in the image.

The image of the examination material is evaluated in real time as the image is scanned, so that an examination part can be classified as soon as it has passed through the measuring station. It is thus possible to flush the parts out in flight by means of flaps or air-jets.

A disadvantage of the known processes is that the detection rate is low with products that are heterogeneously coloured if, in the detection of conspicuous image points, one restricts oneself to the detection of colours which are not contained in the product because very many different colours occur in the product. If detection is widened to include colours which are also contained in the product, in general an unacceptably high proportion of the fault-free product is generally detected as reject material already when there are extensions to include colours rarely occurring in the product.

The object of the invention is to improve the process for the optical sorting of bulk material so that, in the case of heterogeneously coloured bulk material, foreign bodies to be detected are recognized with a very low error rate.

According to the invention a process for the optical sorting of bulk material is provided wherein reflected light of the image points of the examination material for each image point is separated into several colour components by various colour filters and measured by detection elements lying next to one another in a line of the receiver, wherein the sorting is based on the steps of analyzing the colour values of the product in several selected sub-regions of the colour space established by the various colour components, wherein this analysis is performed by, for each sub-region, a classifier which searches connected areas of image points with colour values falling into the respective sub-region associated to said classifier and carries out a classification according to preset criteria from the geometry and the size of these detection areas in the image of the material. The term sub-region refers to any selected part of the colour space or to any sub-space, i.e. any space portion cut out of the overall colour space.

When the image is recorded, the light of every image point is separated by colour filters in front of the detection elements which are arranged in a line, e.g. into the three colour components red (R), green (G) and blue (B). The result of this is that a detection of conspicuous image points (points with colour values which rarely occur in the fault-free product) is possible by evaluation of the colour values (intensities of the colour components) measured by the line elements of the receiver. An evaluation of the geometry is then carried out for local accumulations of conspicuous image points.

Initially, the whole bandwidth of the possible colour value distribution in the colour space is divided into several sub-regions, in which the colour space is spanned by the various colour components measured for each image point, e.g. a three-dimensional space established by the three colour components. Classifiers, i.e. means for evaluating the measured values on the basis of preset criteria, allow a classification of the measured colour values, wherein one classifier concentrates on image points only whose colour-values fall into the associated sub-region of the colour-space and searches for detection areas in the image, i.e. connected areas of conspicuous image points whose colour values lie in the colour sub-region of the classifier.

If the colour values of a homogeneously coloured reject part are contained mainly in the selected colour sub-region, the reject part is detected as a relatively extensive region of image points having colour-values falling in the selected sub-region; the associated classifier who is sensitive only for image points with colour values in the selected sub-region "sees" the reject part as a extended detection area. On the other hand, in the case of the fault-free product within this colour-value sub-region, extensive regions of conspicuous image points are generally found only in very rare cases, and the number of incorrect detections thus remains small. This improvement in classification is used in practical application in that the reject parts are divided into typical types and a classifier with a corresponding sub-region in colour space is established for every type, wherein the classifiers operate in parallel during the examination.

In a preferred embodiment, the colour sub-regions in which the colour values of reject parts are concentrated are selected, by showing reject parts to the system in order to learn the distribution of their colour values.

The invention is explained in more detail below with reference to drawings.

In a colour-sorting machine, the bulk material preferably moves in flight past an observation head with a light source and a product light signal receiver arranged in the vicinity of the light source. The reflected light of every image point of the examination material is broken down by various colour filters of adjacent line elements of a camera line, e.g. of a CCD line, of the receiver into the three colours red (R), green (G) and blue (B). The line elements thus measure in their respective spectral ranges the intensity of the image points, also called colour values. There thus results a three-dimensional distribution of colour values in a three dimensional colour space, the axes of which are defined by the red, green and blue colour values. In the following one-dimensional examples of the distribution are discussed for illustration purposes, i.e. only one axis of the colour space is shown.

Figure 1:
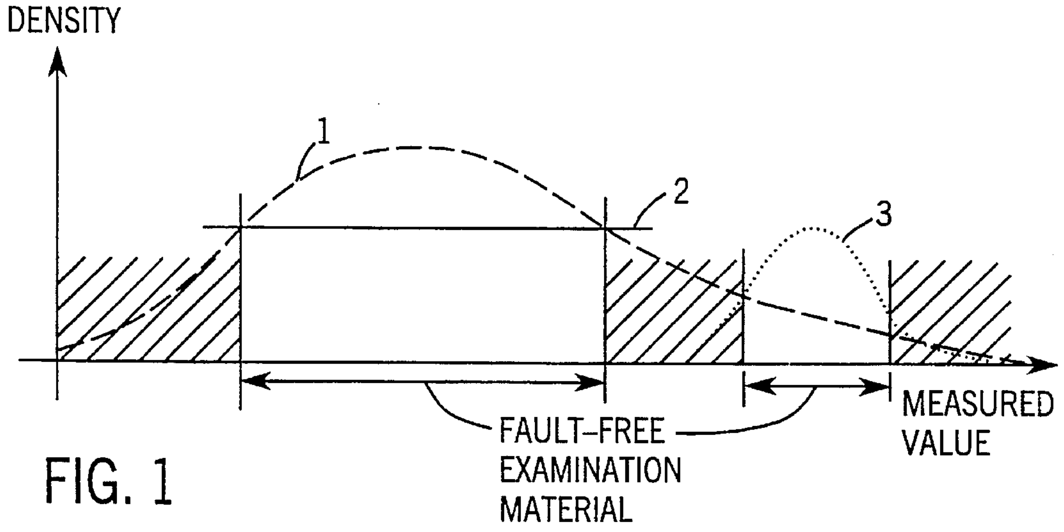
FIG. 1 shows by way of example a one-dimensional colour-value distribution with the ranges for fault-free examination material.

Referring to FIG. 1, the examination material is surveyed without reject parts in a pre-learning process and the distribution 1 of the colour values is ascertained.

In a relearning process, the examination material is again surveyed without reject parts and a colour-value range for fault-free examination material is established in a first step, while a threshold 2 based on experience is laid over the distribution 1 of the colour values, whereby the limits of the examination material colour-value range result from the intersection points between the threshold 2 and the curve of the distribution 1.

With the chosen setting of threshold 2, image points which are classified as conspicuous will also occur in the case of fault-free examination material. However, if they accumulate to form extensive regions, these image points would erroneously be classified as reject parts. Experience shows that such an accumulation again occurs mainly in certain colour-value regions. In order to measure these colour-value sub-regions, an extensive image area detected in the fault-free product is stored in the relearning process and the distribution of its colour-values is determined. This distribution is introduced as threshold distribution 3 after a normalization. The sub-region in which of colour-values in which the threshold distribution 3 exceeds the colour-value distribution 1 of the examination material, i.e. in the one-dimensional example the colour-values in the interval between the intersection points of the threshold distribution 3 with the curve of the colour-value distribution 1, is interpreted as belonging to the examination material and thus will not lead to a fault detection.

Figure 2:
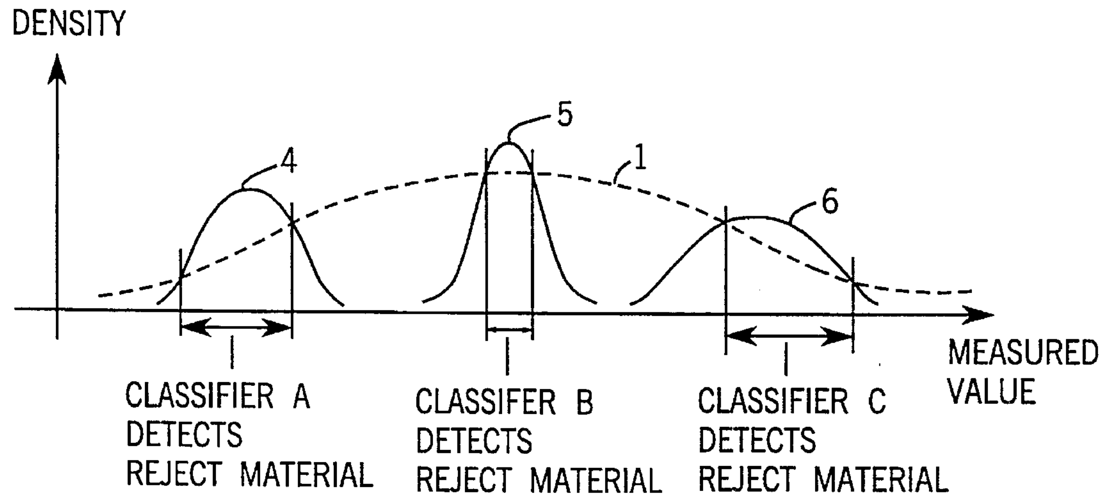
FIG. 2 shows a one-dimensional example for classification with classifiers operating in parallel upon recognition of reject parts whose colour values overlap with the colour values of the product.

For the measurement of examination material mixed with reject parts, the colour-value ranges of the product are divided into sub-regions. Referring to FIG. 2 of this example, each of the classifiers A, B and C operating in parallel concentrates only on one sub-region. If the colour values of the homogeneously coloured reject part are contained mainly in the chosen sub-region, the reject part is detected as a relatively extensive area in the image and can be recognized by evaluation of the detection area. Here, too, the distributions of the colour values of these extensive regions are measured and introduced as thresholds after their normalization. All sub-regions of colour values in which these threshold distributions 4, 5 and 6 exceed the colour-value distribution 1 of the examination material are selected and interpreted as conspicuous regions for reject parts and may lead to a fault detection.

Figure 3:
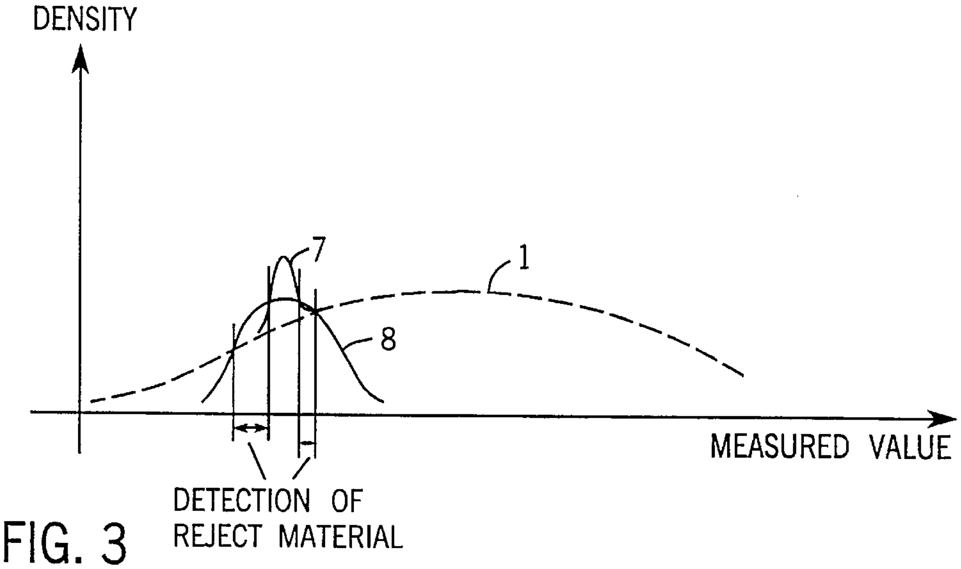
FIG. 3 shows a one-dimensional example for the adjustment of a classifier through relearning.

It is also possible that, with a fault-free product, extensive detection areas are detected in a colour-value region monitored by a classifier, and thus fault-free product may randomly be classified as a reject part. In a further relearning process, specially these colour values which lead to extensive detection areas in the fault-free product range are learnt and recognized as fault-free examination material by altering the thresholds and thereby redefining the sub-regions. Referring to FIG. 3 the threshold 8 shows the colour-value distribution of a reject part. Within the colour-value sub-region determined by the threshold 8, i.e. within the interval defined by the intersection points of distributions 8 and 1, fault-free examination material is classified as a reject part if the associated classifier detects by chance a sufficiently large area in the image with colour values in this sub-region. Through the relearning process, the colour-value distribution of this extensive detection region in the fault-free examination material is determined and introduced as threshold 7 after a normalization. The sub-region of colour values in which the threshold distribution 7 exceeds the threshold distribution 8 of the reject part is removed from sub-region of the reject part and is therefore no longer monitored by the classifier. After redefinition of the sub-region the extended areas detected randomly in the fault-free examination material no longer lead to a fault detection since the classifier is no longer sensitive to the particular colour values in which they are concentrated.

After the learning, automatic examination of the product continues.

During the examination, which can last for days, systematic drift-like changes in the product may occur. These changes lead to a system efficiency which diminishes with time. In order to avoid this, the classification system is doubled. One system takes over the examination task, while the other system measures the current colour-value distribution of the examination material. The measurement of the current colour-value distribution is monitored by the examining classifier in order that, during this measurement, no colour values of the reject parts are detected. After a representative number of measured values have been registered, the learning classifier is activated for the examination task with the newly measured distribution, while the classifier, which until now has been set to examination, takes over the learning task.

This adaptation is only possible if a detected colour point classified as conspicuous does not in every case lead to a rejection decision. If a detected colour point always lead to a rejection decision, the learning classifier could not adopt any new colour values, as the newly learnt colour-value distribution is discarded in the event of a rejection decision. However, since, with the system, detected colour points are classified as a reject part only if they form a fairly large connected area, the measured frequency can also be adapted in the case of detected colour values. Conversely, with this adaptation the system can detect colour values belonging to the reject parts which were represented in the colour-value distribution of the examination material in an earlier measurement and are no longer contained in the currently measured distribution.

Figure 5:
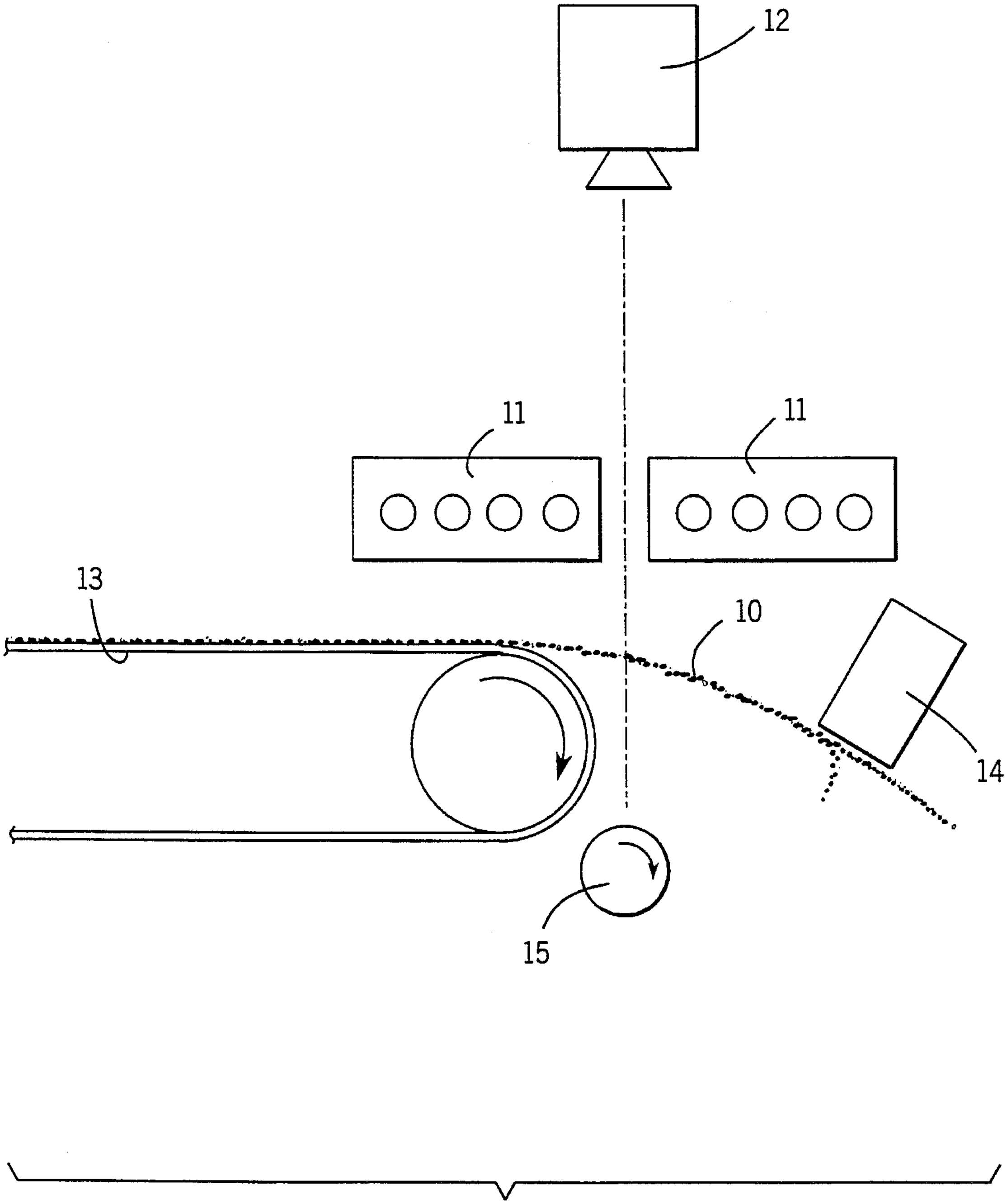
FIG. 5 is a schematic diagram of a first embodiment of an apparatus for carrying out the process of the invention.

Referring to FIG. 5, during the recording of the image, the examination material 10 is lit for example by two lamps 11 from the direction of the line camera 12. The optical axis of the line camera 12 lies between the two lamps. With this arrangement, the structure of the background becomes very important, because the background should, if at all possible, not broaden the colour-value distribution of the fault-free product. A broadening would reduce the detection efficiency.

This requirement cannot be met if the examination material 10 is recorded lying on the transport belt 13. Because of contamination and wear, the belt 13 does not have a uniform colour. In addition, shadows develop on the transport belt 13, which leads overall to a substantial broadening of the colour-value distribution when measuring the fault-free examination material. For this reason, the examination material 10 is observed in flight and then passed to an air-jet device 14 as noted above.

In a first variant, the background has the colour of the examination material 10, which has the advantage that the contrast between background and examination material is slight and the colour-value distribution of the examination material is thus not substantially broadened by margin effects at the transition from background to examination material. This variant produces the best results as regards colour and position resolution.

The disadvantage of contamination is avoided by constructing the background as a rotating roller 15 which immediately throws off deposits. The shadow of the examination material on the background becomes diffuse and harmless depending on the fill density if the rotating roller 15 is installed at a matched distance from the examination material 10. If the fill density of the examination material 10 is high, an excessive darkening of the background is avoided by additional illumination of the background. Alternatively, the background can be a cylindrical radiator which radiates in the colour of the examination material and is surrounded by a transparent rotating roller which throws off the deposits.

Figure 6:
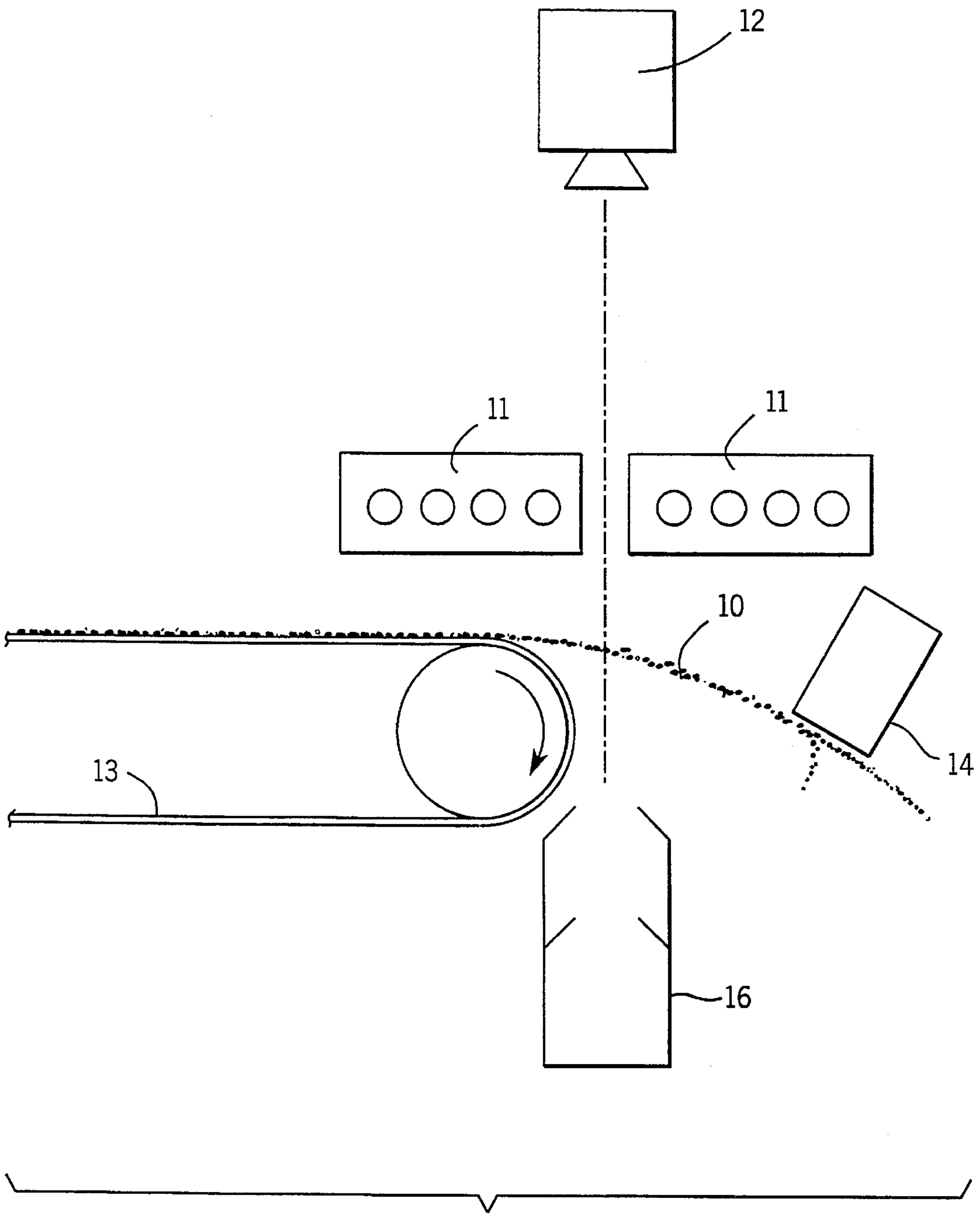
FIG. 6 is a schematic diagram of a second embodiment of an apparatus for carrying out the process of the invention.

In a second embodiment shown in FIG. 6, the background is a dark hole 16, which has the advantage that the examination material can be segmented from the background and there is no impairment through contamination and shadow formation. In the case of a segmenting of the examination material, the shape can for example be used for separating fault-free examination material and reject parts.

To provide the dark hole 16, as large as possible a container is built with low-reflectivity walls. The line camera looks through a slit into this container. The slit is matched as regards its width to the f-stop and focal distance of the camera lens and to the distance from the sharpness plane.

Figure 4:
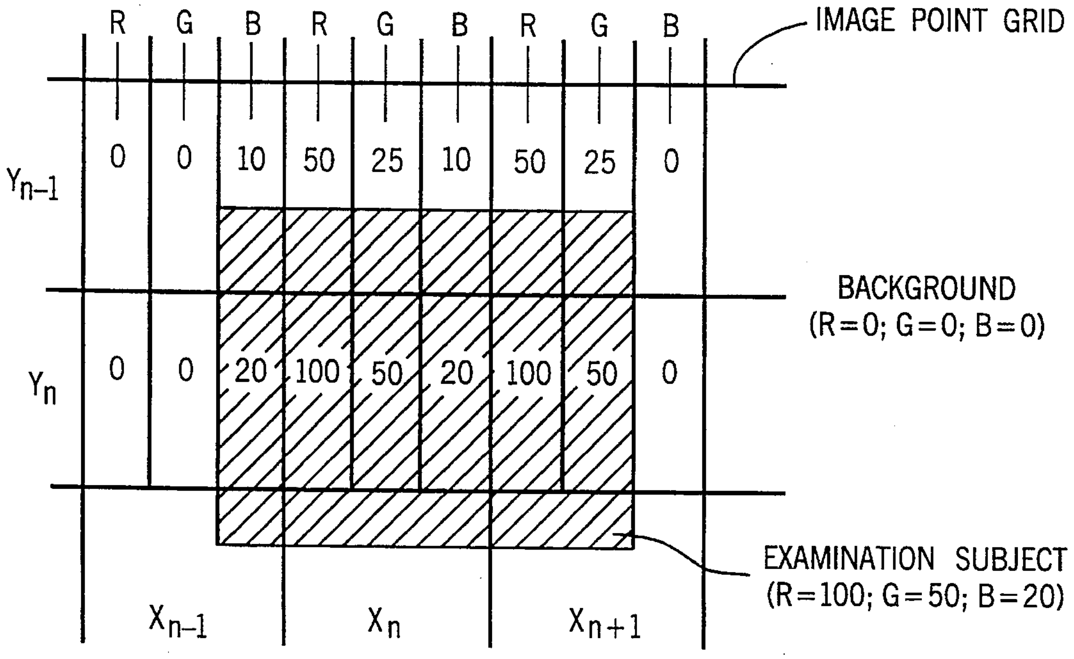
FIG. 4 shows an example for the colour classification at the edges of an examination part using a camera in which the colour sensors are arranged alongside one another.

During the recording of the image, the light of every image point is broken down into the three colours red (R), green (G) and blue (B). Depending on the scanning principle chosen and the setting of the camera, the colour components are not ideally measured at the same place, but positionally offset. With current colour cameras, the colour sensors even lie positionally next to one another, so that the colour sensors see different local regions of the item under examination as regards one image point. Referring to FIG. 4, the colour sensors (R, G, B) are arranged horizontally, while the item under examination moves past this horizontal line from top to bottom. In this example, the background produces the signal levels R=0, G=0 and B=0 in the case of the colour sensors in question, while the item under examination produces the signal levels R=100, G=50 and B=20. In FIG. 4, only the sensor triple Xn, Yn measures the correct colour of the item under examination here. In the case of all the other triples, colour values are measured which contain at least one colour value which is darker than the corresponding colour value of the examination material. Thus, for example the triple Xn, Yn−1 measures the levels R=50, G=25 and B=10. In order to avoid these disruptions, image points whose colour values are darker by an adjustable factor than those of the corresponding neighbouring point are suppressed, the signal levels being stored and a comparison carried out of the horizontal and vertical neighbouring points.

We claim:

1. A process for the optical sorting of an examination material comprising a bulk material, comprising:

conveying the examination material over a transport belt and moving it past an observation head with a light source and a product signal receiver arranged in the vicinity of the light source;

measuring light reflected back from the examination material by means of detection elements lying next to one another along a line on the receiver, the detection elements measuring an image wherein each image point is broken down into one of several color components by color filters;

sorting the bulk material from reject parts on the basis of color values given by the intensities measured in the color components for each image point by analyzing color values of the examination material in several selected sub-regions of a color space established by the color components;

ascertaining by a classifier, for each sub-region, connected areas of image points with color values falling into the respective sub-region; and carrying out a sorting classification according to preset criteria applied to the geometry and the size of these ascertained connected areas in the image of the examination material;

wherein through comparison of color signals of adjacent image points, large gradients are determined and generally disrupted color values resulting from such gradients are not taken into account during the color value measurements.

2. A process for the optical sorting of an examination material comprising a bulk material, comprising:

conveying the examination material over a transport belt and moving it past an observation head with a light source and a product signal receiver arranged in the vicinity of the light source;

measuring light reflected back from the examination material by means of detection elements lying next to one another along a line on the receiver, the detection elements measuring an image wherein each image point is broken down into one of several color components by color filters;

sorting the bulk material from reject parts on the basis of color values given by the intensities measured in the color components for each image point by analyzing color values of the examination material in several selected sub-regions of a color space established by the color components;

ascertaining by a classifier, for each sub-region, connected areas of image points with color values falling into the respective sub-region; and carrying out a sorting classification according to preset criteria applied to the geometry and the size of these ascertained connected areas in the image of the examination material;

wherein the examination of the examination material takes place with a first classification system, while a current distribution of color values of the bulk material, for adjusting to drift-like changes of color values of the bulk material, is measured with a second classification system, and this measurement of bulk material is monitored by the examining first classification system, in order that, during measurement of the examination material, no decision for reject parts is made due to such drift-like changes.

3. A process according to claim 2, wherein both classification systems alternate in their function.

4. A process for the optical sorting of an examination material comprising a bulk material, comprising:

conveying the examination material over a transport belt and moving it past an observation head with a light source and a product signal receiver arranged in the vicinity of the light source;

measuring light reflected back from the examination material by means of detection elements lying next to one another along a line on the receiver, the detection elements measuring an image wherein each image point is broken down into one of several color components by color filters;

sorting the bulk material from reject parts on the basis of color values given by the intensities measured in the color components for each image point by analyzing color values of the examination material in several selected sub-regions of a color space established by the color components;

ascertaining by a classifier, for each sub-region, connected areas of image points with color values falling into the respective sub-region;

carrying out a sorting classification according to preset criteria applied to the geometry and the size of these ascertained connected areas in the image of the examination material; and wherein, in a pre-learning process, the examination material is surveyed without reject parts and its color-value distribution is ascertained for each color component, and in a relearning process, in a first step using examination material without reject parts, a color-value sub-region is defined for fault-free examination material by putting a threshold based on experience over the distribution of measured color values in the color space, wherein the limits of the color value sub-region of the examination material result from intersection points between the threshold and the curve of the distribution; and in the relearning process, using examination material without reject parts, measured values which according to their location in the color space with respect to the limits determined in the first step would be suspected of representing reject parts are ascertained and the size of a local accumulation of these measured values in the image is determined; and in the relearning process, using examination material without reject parts, when a preset extension for this local accumulation of measured values suspected of representing reject parts is exceeded, the threshold is changed for the respective sub-region so that the limits determined according to the first step change and a good examination material determination is made for these measured values.

5. A process according to claim 4, wherein during examination of the examination material, classifiers operating in parallel analyze only sub-regions of the color space in which reject parts are suspected.

6. A process according to claim 5, wherein in the sub-regions of the color space in which reject parts are suspected, their color value distribution has been learned by showing reject parts to the sorting system.

7. A process according to claim 4, wherein measuring of reflected light of the examination material takes place while the examination material is in flight.

8. A process according to claim 4, wherein the reflected light is measured with the examination material in front of a background in the form of a dark hole.

9. A process according to claim 4, wherein the reflected light is measured with the examination material in front of a background which is formed by a cylindrical radiator with a rotating transparent roller surrounding the radiator, wherein the radiator transmits light in a color matched to the examination material.

10. A process according to claim 4, wherein the detection elements lying next to one another along a line on the receiver are arranged in a repeating pattern of color sensitivities.

* * * * *